US00RE36241E

United States Patent [19]

Phelps et al.

[11] E Patent Number: Re. 36,241

[45] Reissued Date of Patent: Jun. 29, 1999

[54] FOOD ARTICLE FILLING HEAD

[75] Inventors: James M. Phelps; Joseph F. Posge, both of Cincinnati, Ohio

[73] Assignee: Planet Products Corporation, Cincinnati, Ohio

[21] Appl. No.: 08/804,330

[22] Filed: Feb. 14, 1997

Related U.S. Patent Documents

Reissue of:

[64] Patent No.: 5,388,385
Issued: Feb. 14, 1995
Appl. No.: 08/045,035
Filed: Apr. 8, 1993

[51] Int. Cl.[6] ..... B65B 5/00; B65B 1/00; B65B 39/02

[52] U.S. Cl. ..... 53/247; 53/148; 53/248; 53/252; 53/540; 414/746.8; 414/794.2

[58] Field of Search ..... 414/746.8, 794.2; 53/148, 236, 242, 247, 248, 252, 493, 531, 535, 537, 540

[56] References Cited

U.S. PATENT DOCUMENTS

| | | | |
|---|---|---|---|
| 3,067,558 | 12/1962 | Good | 53/247 |
| 3,279,147 | 10/1966 | Garapolo | 53/252 |
| 3,498,022 | 3/1970 | Godet | 53/248 |
| 3,778,965 | 12/1973 | O'Lenick et al. | 53/248 |
| 3,837,140 | 9/1974 | Golantsev et al. | 53/247 |
| 4,386,490 | 6/1983 | Griffith et al. | 53/247 |
| 4,733,518 | 3/1988 | Griesdorn | 53/148 |
| 5,117,614 | 6/1992 | Johnsen | 53/247 |

*Primary Examiner*—W. Donald Bray
*Attorney, Agent, or Firm*—Thompson Hine & Flory LLP

[57] ABSTRACT

A filling head for loading food articles such as franks into individual packaging trays is adapted for quick connect to a power system and a loader parent machine. The filling head comprises an open frame, at least two spring loaded flapper doors hingeably attached to the frame, and a pusher bar unloading system capable of operable connection to the power system of the parent machine to intermittently discharge food articles from the filling head to the individual packaging trays positioned below the flapper doors. The pusher bar unloading system includes a drive rod which can be connected to the periphery of a flywheel by quick connect means to run in an smooth continuous reciprocating motion to deliver an up and down motion to a horizontal shaft slideably mounted on the frame and an associated set of pusher bars and elongated pusher members. The elongated pusher members at the bottom of the drive rod stroke forces food articles in the filling head to open the flapper doors and drop the food articles into the packaging trays. The filling head has quick connect features which allows the use of different filling heads constructed to deliver different food article arrangements into packaging trays.

44 Claims, 8 Drawing Sheets

FOOD ARTICLE FILLING HEAD

Matter enclosed in heavy brackets [ ] appears in the original patent but forms no part of this reissue specification; matter printed in italics indicates the additions made by reissue.

This invention relates to a filling head for food articles such as franks or other similarly shaped processed food articles of roughly equal size. More particularly, the invention relates to a food article filling head capable of quick connection with a loader parent machine to allow an interchanging of different sized and configured heads to accommodate desired packaging tray arrangements.

Packing machines for all types of foods are very common and have been widely used for many years. Typically, processed food articles have a uniform shade which renders them conducive to high speed automated packaging machines. The processed food articles move along a conveyor to a filling head and into trays, boxes or some other form of packaging container. Often, the containers also are on a high speed conveyor which moves the containers with the loaded food articles to a wrapping station or another processing station used in the ultimate distribution of the food to the consumer.

Speed of packaging the food articles is of utmost importance. Any packaging machine must keep up with the supply of food articles being processed. It is particularly important for sanitation reasons to minimize the exposure of many processed food articles to the ambient temperatures in a packaging plant. Machines are known which can load processed food articles such as franks into packaging trays. Most have a filling head where the food articles are loaded, then unloaded into containers. The filling head can be configured to load one or more containers at a time. The containers themselves can be one of many different sizes to hold any desired number of food articles. Ideally, any filling head on a loader will be versatile enough to accommodate the varied food article packaging sizes and arrangements.

In accord with a need for fast and efficient food article packaging, there has been developed food article filling heads for loader parent machines. The filling heads have quick connect features to allow a head with desired capacity and food article arrangement to be selected and installed on the parent machine. A limited number of interchangeable filling heads for a loader parent machine lends a great deal of versatility to the type of package containers, both in capacity and physical food article arrangement, that can be loaded. Most importantly, the filing head is able to operate at an increased speed and in a very efficient manner. These and other advantages of the filling head of the invention will be apparent from the description which follows.

SUMMARY OF THE INVENTION

A food article filling head is capable of being readily connected to and disconnected from a loader parent machine to make possible the interchangeability of filling heads with different configurations to provide varied food article arrangements. The filling head comprises an open frame with means to semi-permanently attach it to the loader parent machine to receive food articles in an aligned array. At least two spring loaded flapper doors are hingeably mounted on the frame to form a substantially flat receiving surface to hold food articles as they are being loaded into the filling head from a conveyor of the parent machine. A pusher bar unloading system is capable of operable connection to a power system of the parent machine to intermittently discharge food articles from the filling head to individual packaging trays positioned below the flapper doors. The unloading system includes a set of slide blocks mounted to the frame, a horizontal shaft mounted in the slide blocks, a drive rod pivotally attached at one end to the horizontal shaft and rigidly attached at another end to a crank arm with quick connect means, a set of pusher bars rigidly attached to the horizontal shaft and horizontal elongated pusher members attached to the pusher bars. Reciprocating motion from the drive rod causes the pusher bars and associated elongated pusher members to travel from a disengaging position to an engaging position with the loaded food articles with sufficient force to cause the flapper doors to open and allow the food articles to drop into the packaging trays.

DETAILED DESCRIPTION OF THE INVENTION

Figure 1:
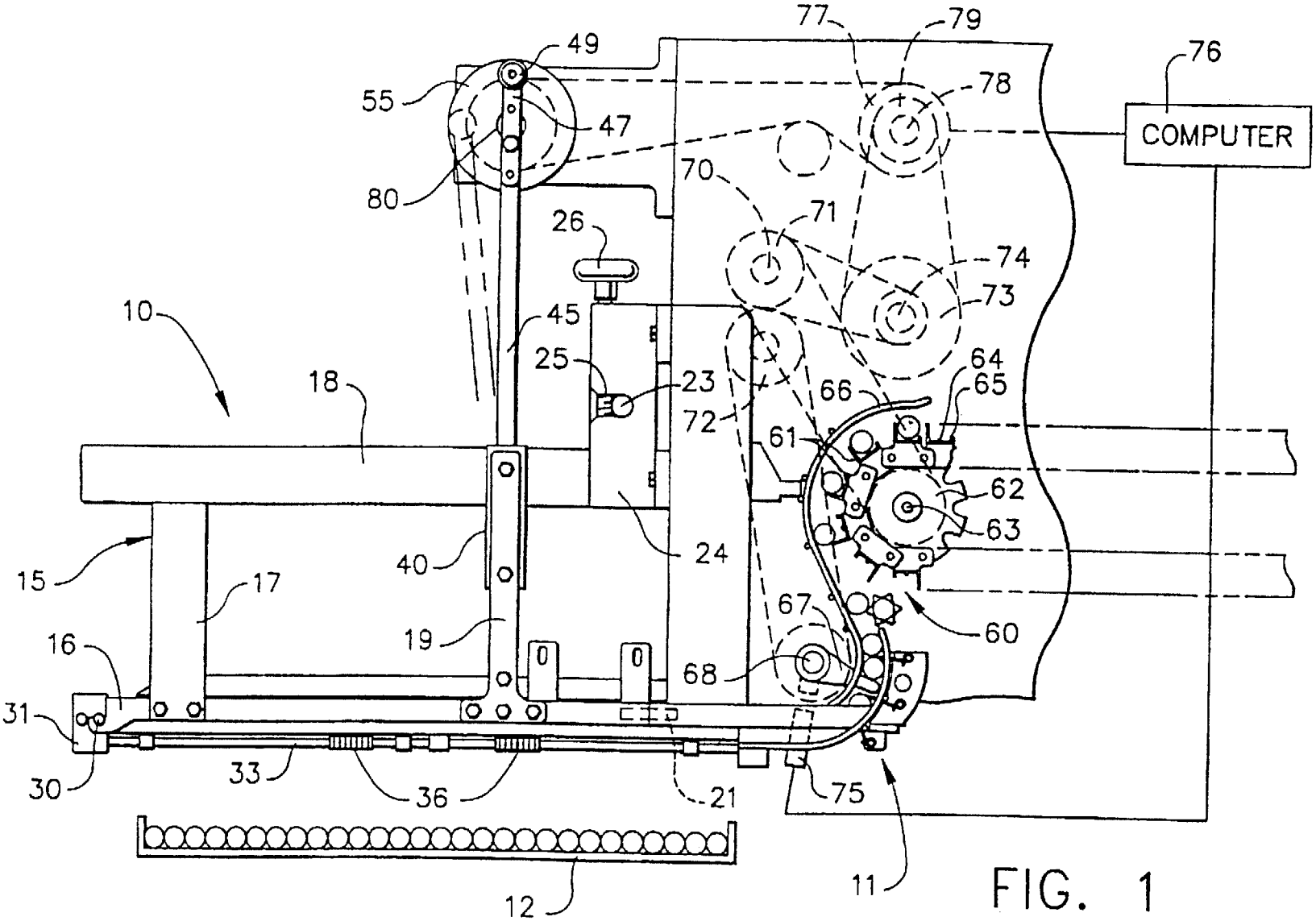
FIG. 1 is a side view of the food article filling head of the invention operably connected to an input conveyor belt and power system of a loader parent machine.

The food article filling head of the invention is described in detail in the following paragraphs and with reference to the drawings. The filling head is particularly useful for the filling of franks into packaging trays and for this reason is described. Other food articles such as sausage links, fish sticks, zucchini sticks and the like can as well be loaded in the filling head and discharged into specially configured individual containers. The food articles are similarly shaped of roughly equal size and include cylindrical-, rectangular-, square- and oblong-shaped articles. The containers include the packaging trays as well as cartons and boxes. The packaged articles are for home sales as well as restaurant and institutional sales.

With reference to FIGS. 1–5, there is shown a food article filling head 10 of the invention operably connected to a loader parent machine 11 and positioned over packaging trays 12. The filling head is capable of quick connection to and quick disconnection from the loader parent machine by means described in detail in the following paragraphs. The parent machine is constructed and operates in a known manner. It comprises conveyors for receiving the processed franks and arranging them in an aligned side by side arrangement. It is adapted for use with the food article filling head 10 of the invention by the inclusion of guide connect pin receiving mounts and mounting blocks with bar-receiving grooves, each more particularly described below. While not illustrated, the packaging trays are conveyed to and from the filling head by a conveyor of a packager in synchronization with operation of the filling head. Such packagers are well known and readily interface with the filling head of the invention.

The filling head 10 has an open frame 15 with two horizontal lower support members 16, a transverse U-shaped cross-member brace 17 attached to the lower support members, two horizontal upper support members 18 attached to the cross-member brace 17, and two vertical rail support members 19 extending from the lower support members 16. The frame 15 is configured depending on an input conveyor of the parent machine, the packaging trays and the number of franks to be filled at a time. As most evident in FIGS. 1 and 2 the filling head 10 is configured to receive two rows of franks aligned side by side, with each row of franks being loaded twenty-eight at a time into a packaging tray. One tray receives the two rows of franks per cycle with a double layer of franks being discharged during two cycles into each tray to fully load it. Other loader parent machines can deliver three or more rows of franks to the filling head in which case the filling head is configured to handle the increased load. The number of franks loaded into an individual packaging tray can vary as well as the number of layers, i.e. a single layer or multiple layers. The width and length of the frame 15 is varied accordingly as well as the number of flapper doors as discussed in detail below.

The frame 15 of the food article filling head is adapted for connection to the loader parent machine and is capable of holding flapper doors and a pusher bar unloading system, including a drive rod which delivers power from a power system of the parent machine to open the flapper doors at the proper time. The frame members are made of a rigid material, normally machined steel and/or plastic. The respective frame members are permanently secured together by welds, bolts and nuts or other conventional attachment means.

Figure 2:
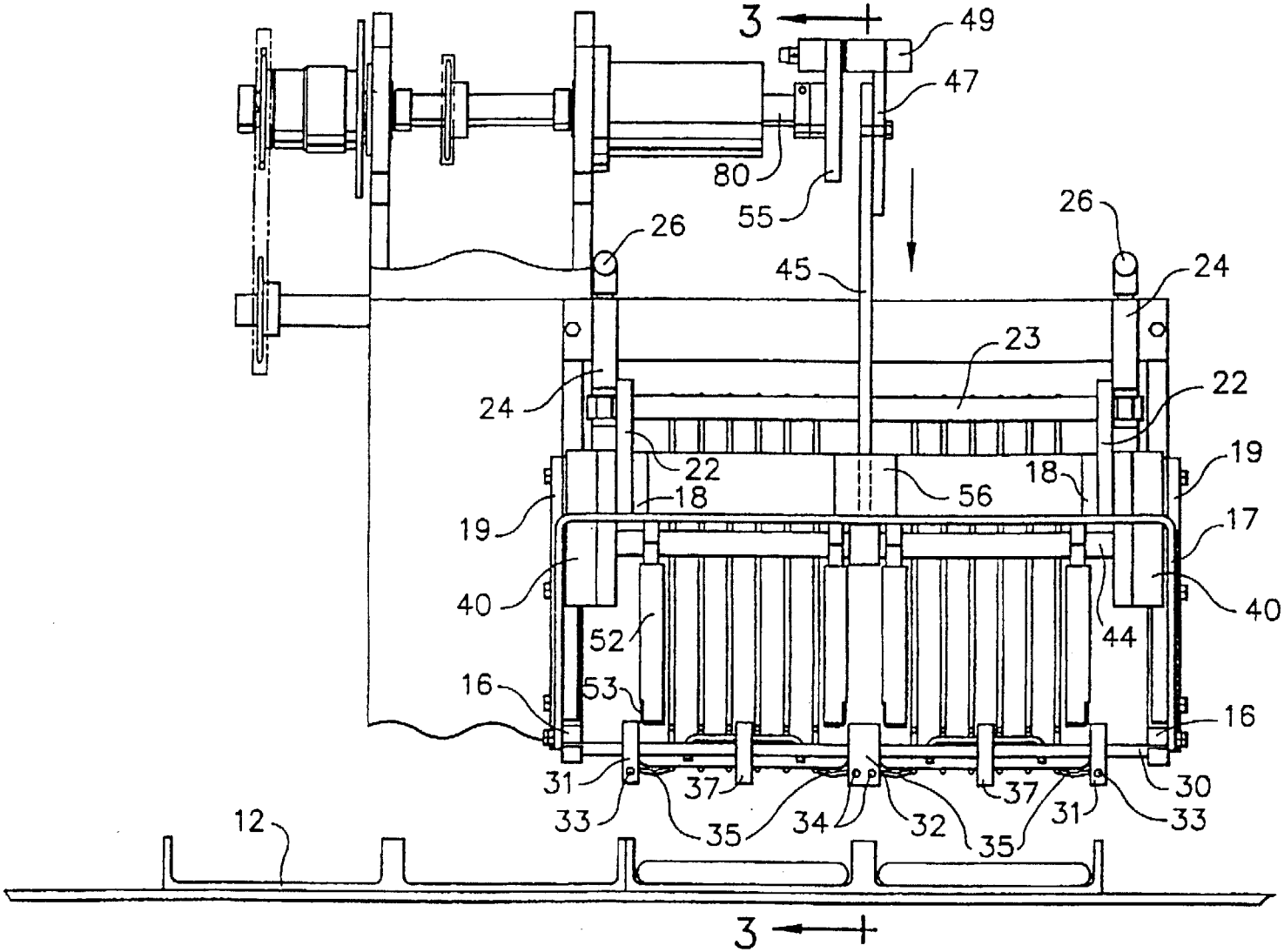
FIG. 2 is a front view of the food article filling head of FIG. 1 showing food articles in position for loading into a packaging tray.
Figure 3:
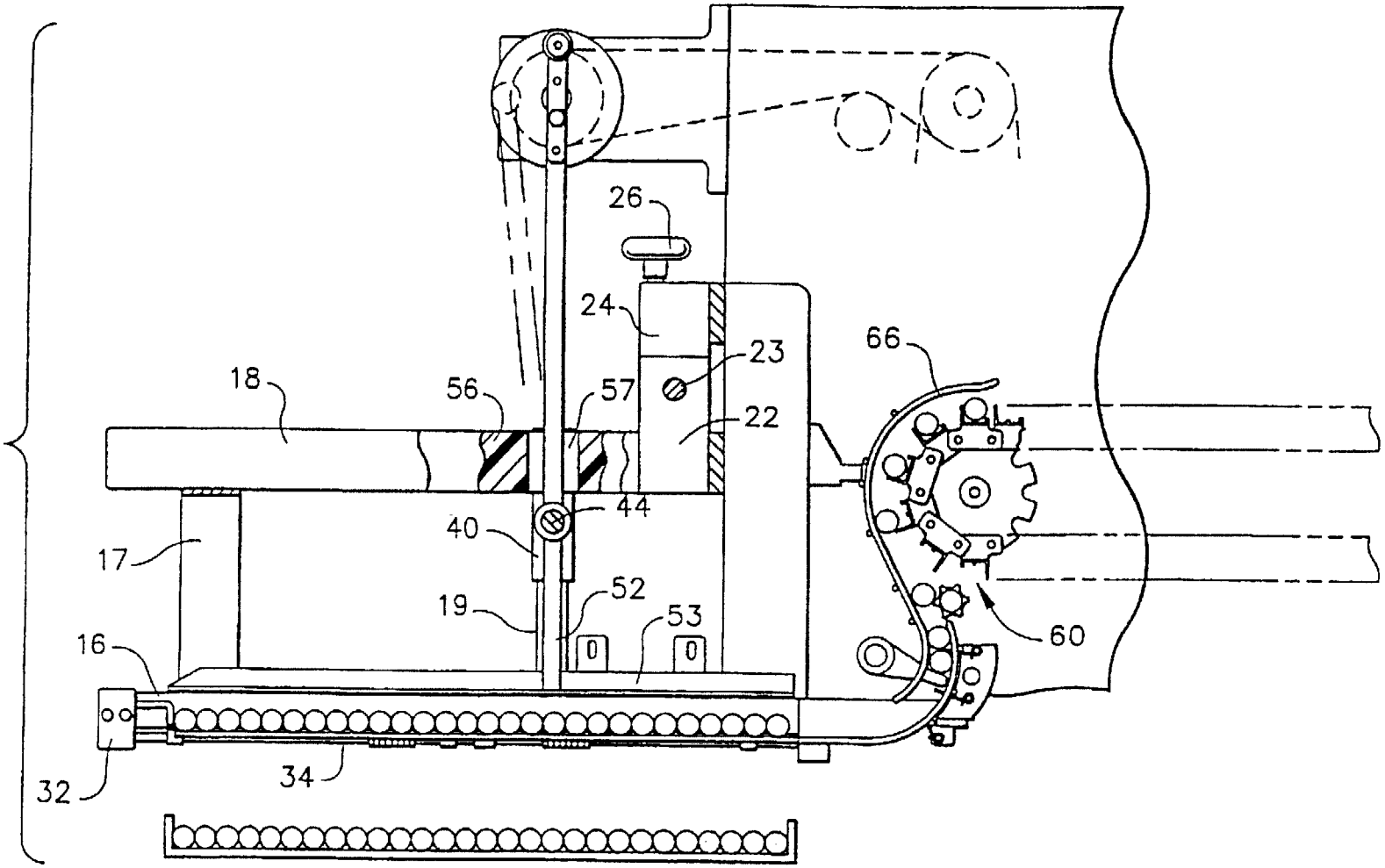
FIG. 3 is a side view partially in section of the food article filling head of FIG. 1 showing a pusher bar unloading system and showing a drive rod connection to a power system.

Quick connect means on the frame 15 allow it to be readily installed and removed from the loader parent machine 11. This feature is needed because of the need to change filling heads depending on the desired individual packaging tray arrangements. As best seen in FIG. 1, each of the horizontal lower support members has a mounting guide pin 21 (shown in phantom) extending axially from its end. Mounts in the parent machine are positioned to receive the guide pins. A transverse horizontal mounting bar is also used in conjunction with the mounting guide pins. As best seen in FIGS. 2 and 3, a bracket 22 is permanently attached to each of the horizontal upper support members 18 of the frame 15 at the end nearest the parent machine. The brackets 22 extend above the frame and permanently hold ends of a horizontal mounting bar 23. With reference to FIGS. 1 and 2, mounting blocks 24 each with a receiving groove 25 are fixedly attached to the loader parent machine to receive the horizontal mounting bar 23 when the food article filling head is properly positioned juxtaposed the parent machine. Once so positioned, the mounting bar extends fully into the grooves. A vertical hole in each mounting block receives a drop pin 26. The drop pins 25 engage a side of the mounting bar 23 and in effect lock the filling head in place. The drop pins are readily removed and the frame pulled away from the loader parent machine as need dictates.

At least two spring loaded flapper doors are mounted on the frame to control the loading and discharging of franks from the filling head. The filling head 10 is configured to discharge two rows of franks at a time. Accordingly, two sets of flapper doors are mounted to the frame. The flapper doors are suspended from the frame by the use of a front rod 30 and a back rod (not shown). The front rod 30 extends between the two horizontal lower support members 16 and rests in notches at their terminuses. The front rod 30 is used to hold hanger brackets 31 near each horizontal lower support member and a hanger bracket 32 at a mid-point. Associated brackets are positioned on the back rod. Door rods 33 are hung to the frame by use of the brackets 31 to extend along each of the horizontal lower support members 16. Parallel internal door rods 34 are attached to the bracket 32. Each set of door rods 33 and 34 is each used to hold two cooperating flapper doors 35, best seen in FIG. 2. The flapper doors extend substantially the full length of the frame and extend inwardly a sufficient distance to provide support to the franks to hold them in a flat plane. The free edge of each door 35 is offset from the hinged end to minimize contact with the franks and to allow them to more freely drop when the doors are forced open as more fully described below. Generally, a flapper door width of about one inch to about three inches for each associated flapper door is adequate to provide ends of the franks with sufficient support to maintain them in a planar disposition. At least two torsional springs 36 are mounted on the door rods and are operably associated with each flapper door 35 to hold it in a substantially horizontal closed positioned which will return to that position after an opening force is removed.

Figure 4:
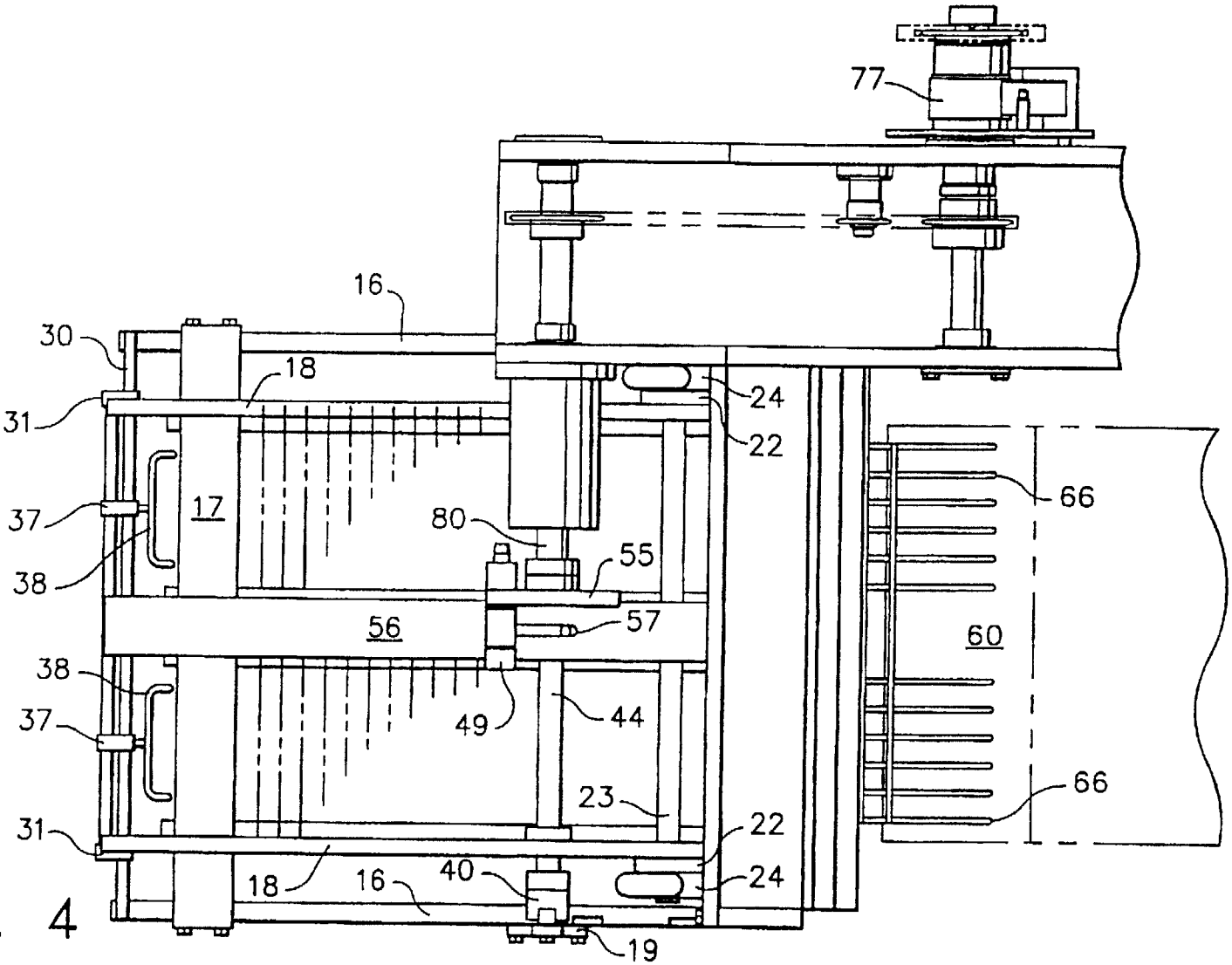
FIG. 4 is a top view of the food article filling head of FIG. 1 showing the power system connections.

The front rod 30 which extends between the two horizontal lower support members 16 is also used to hold end stops to limit the forward movement of the franks during a loading step. As seen in FIGS. 2 and 4, two hanger brackets 37 are mounted on the front rod 30 at an approximate mid-point of each frank row. Each end stop 38 extends from the bracket 37. The end stop 38 is a generally U-shaped member which extends inwardly in a planar disposition to engage the front frank of a row of franks being loaded into the filling head.

The pusher bar unloading system on the filling head is used to intermittently discharge franks from the filling head to individual packaging trays directly below the flapper doors. The pusher bar unloading system is operably connected to the power system of the loader parent machine to translate a rotary motion of a flywheel to force a downward motion to a drive rod to cause the flapper doors to open and drop a full load of franks into the packaging trays. The filling head is reloaded with more franks during an upward motion of the rod.

Figure 7:
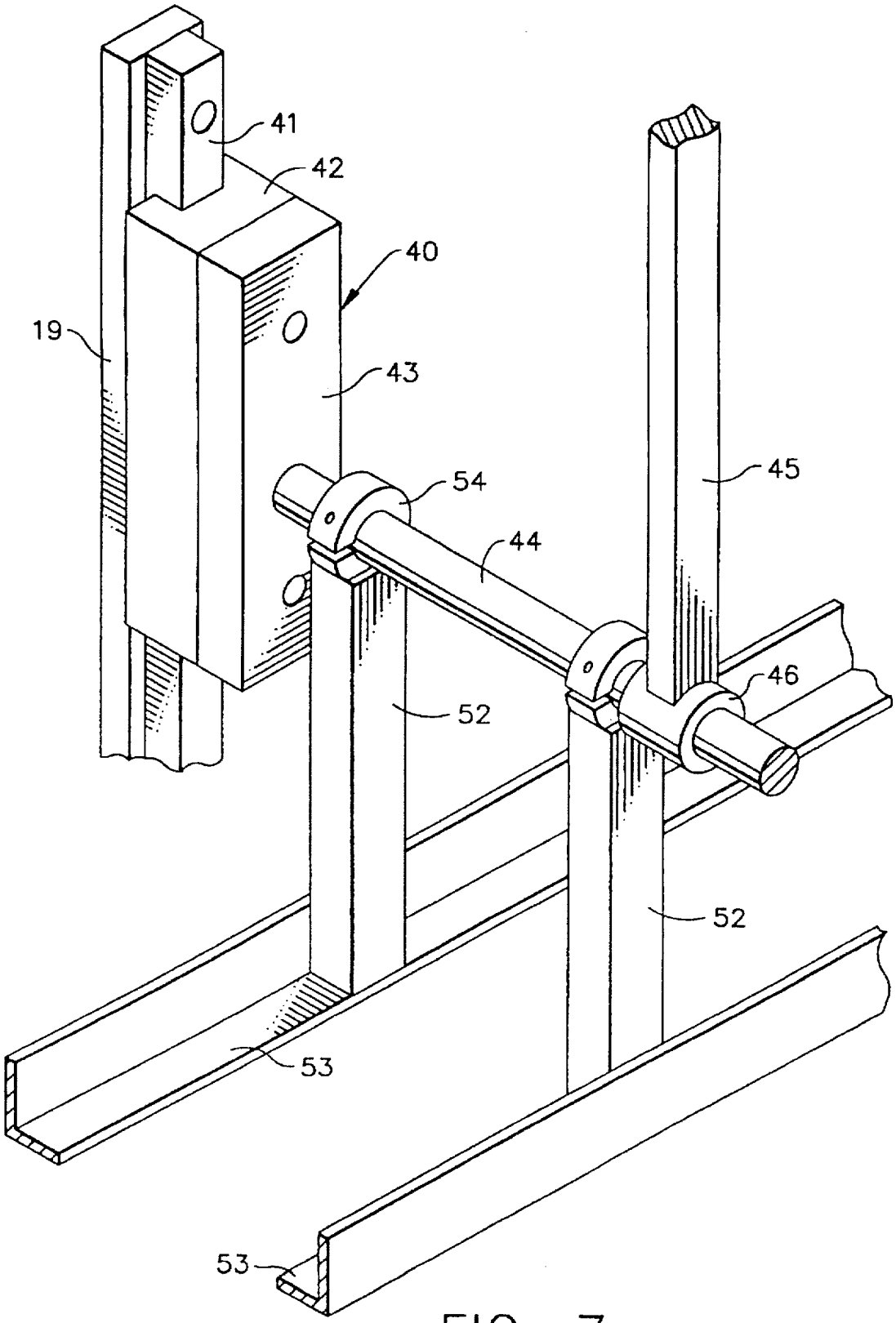
FIG. 7 is a perspective view in isolation showing in detail the pusher bar unloading system of the food article filling head of FIG. 1.
Figure 8:
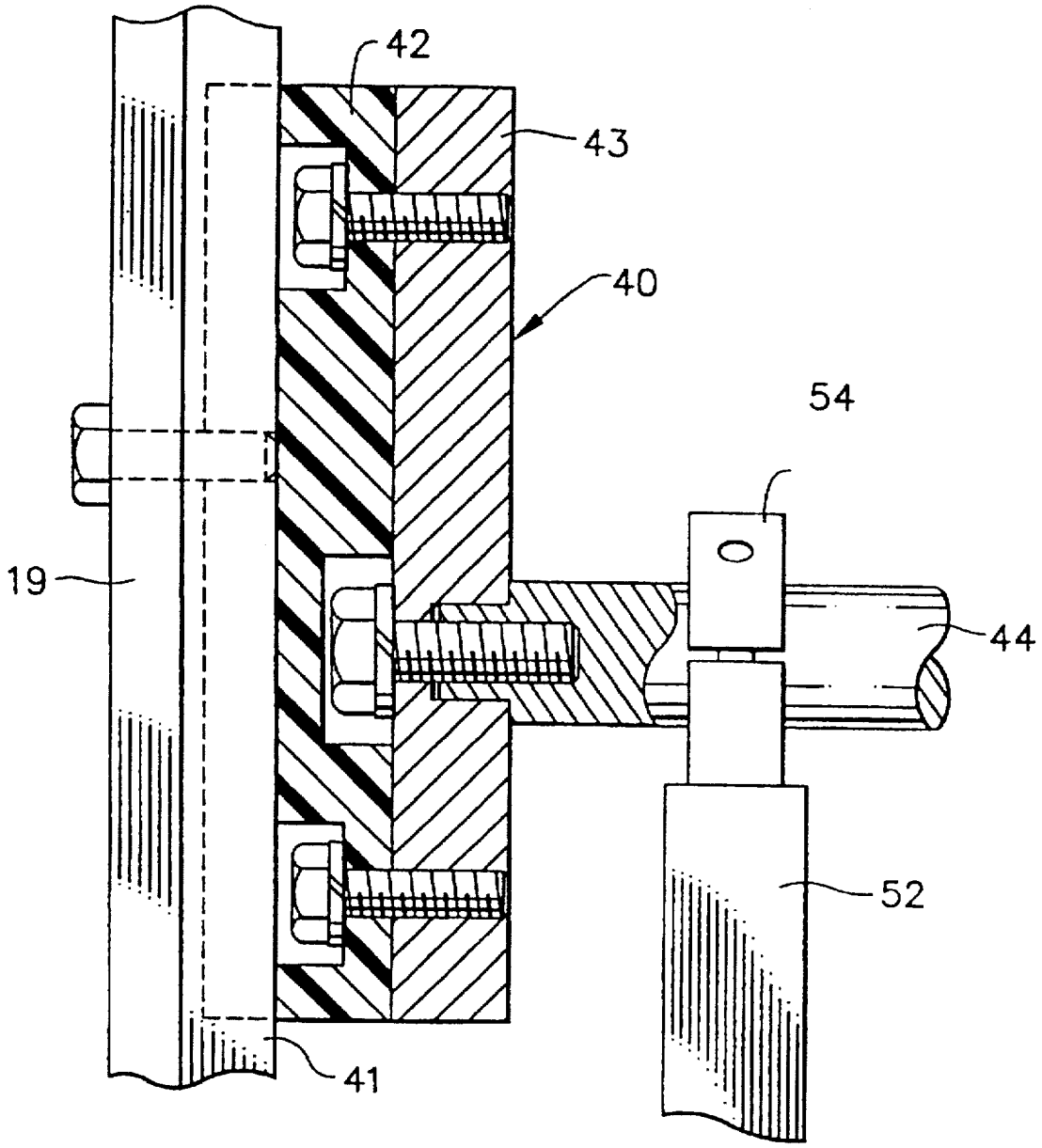
FIG. 8 is a side view partially in section showing in detail a slide block assembly of the pusher bar unloading system.

As best seen in FIGS. 2, 3, 5 and 7 the pusher bar unloading system has a set of slide block assemblies 40 mounted on rails 41 extending along the vertical rail support members 19 of the frame 15. Each rail 41 is permanently secured to a vertical rail support member 19. With particular reference to FIG. 7, each block assembly 40 has a plastic slide block 42 with a groove to ride along the rail 41. A metal bearing block 43 is secured by screws to the plastic slide block 42. Each bearing block 43 has a centered hole to receive and hold in a fixed position an end of a horizontal shaft 44. The horizonal shaft 44 is rigidly attached to the two block assemblies in a manner whereby it can only move in an up or down direction.

Figure 6:
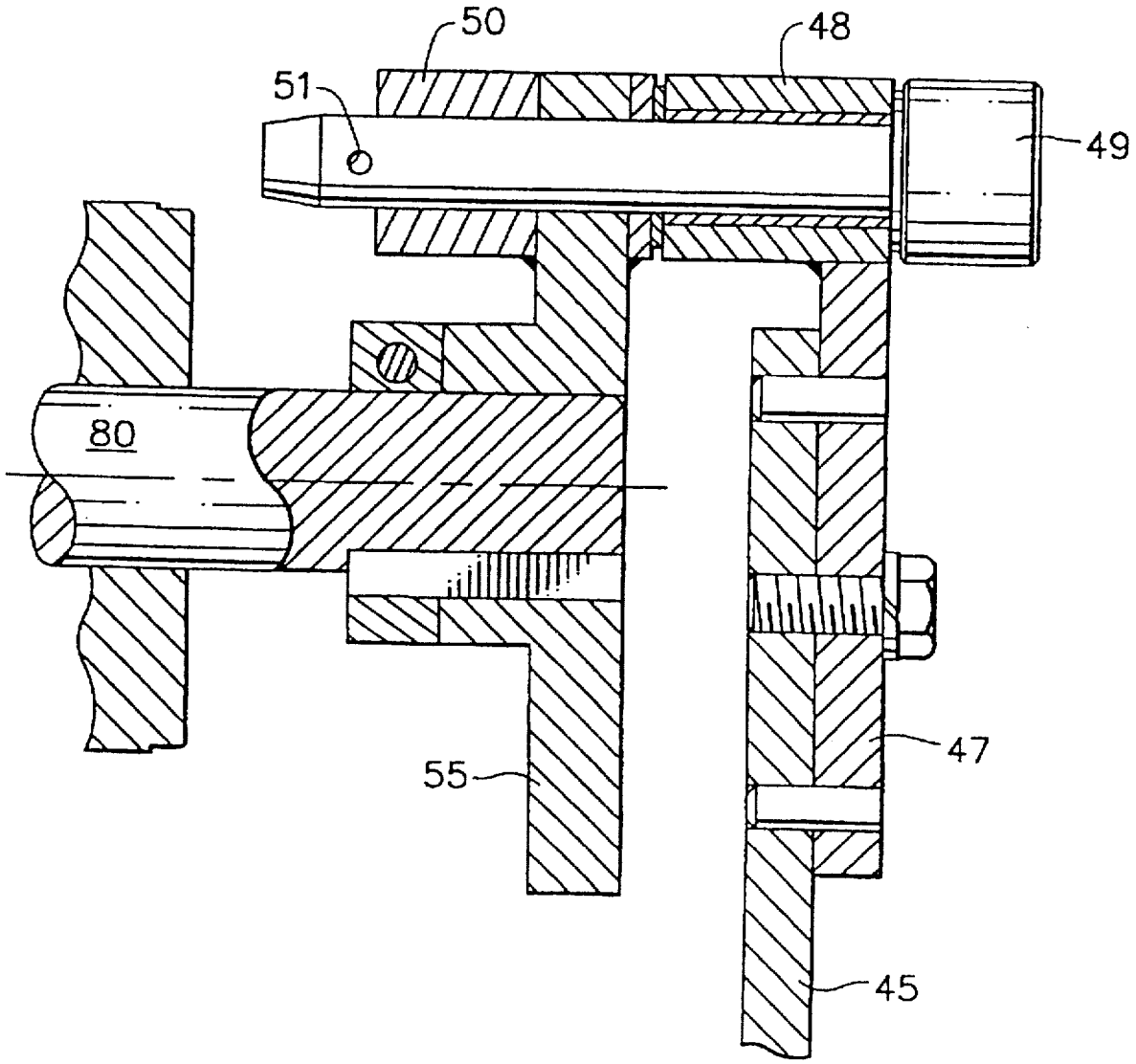
FIG. 6 is a side view partially in section of a quick connect system of the food article filling head of FIG. 1 showing its connection to the power system.

A drive rod 45 is pivotally secured to the horizontal shaft 44 to cause the shaft to move in a timed relationship as discussed below. A collar 46 attached to the drive rod 45 and with an inside diameter slightly larger than the diameter of the horizontal shaft 44 allows the drive rod to force the shaft down yet allows the drive rod to rotate partially around the shaft in response to the flywheel movement. A crank arm 47 extending from the drive rod is rotatably secured to a periphery of the flywheel. With reference to FIG. 6, the drive rod 45 is bolted to the crank arm 47. Rivets on either side of the bolt extending from the crank shaft into the drive arm ensures a rigid connection. A quick connect means rotatably attaches the crank arm 47 to the flywheel 55. A first bushing 48 is welded to the free end of the crank arm 47. A quick connect pin 49 passes through the bushing 48 and a hole in the periphery of the flywheel 55. A second bushing 50 is welded to the backside of the flywheel to reinforce the attachment. A cotter pin passing through a cotter pin hole 51 holds the quick connect pin 49 in place during operation. The cotter pin's removal allows the removal of the quick connect pin and is one step in changing filling heads on the loader parent machine.

Figure 5:
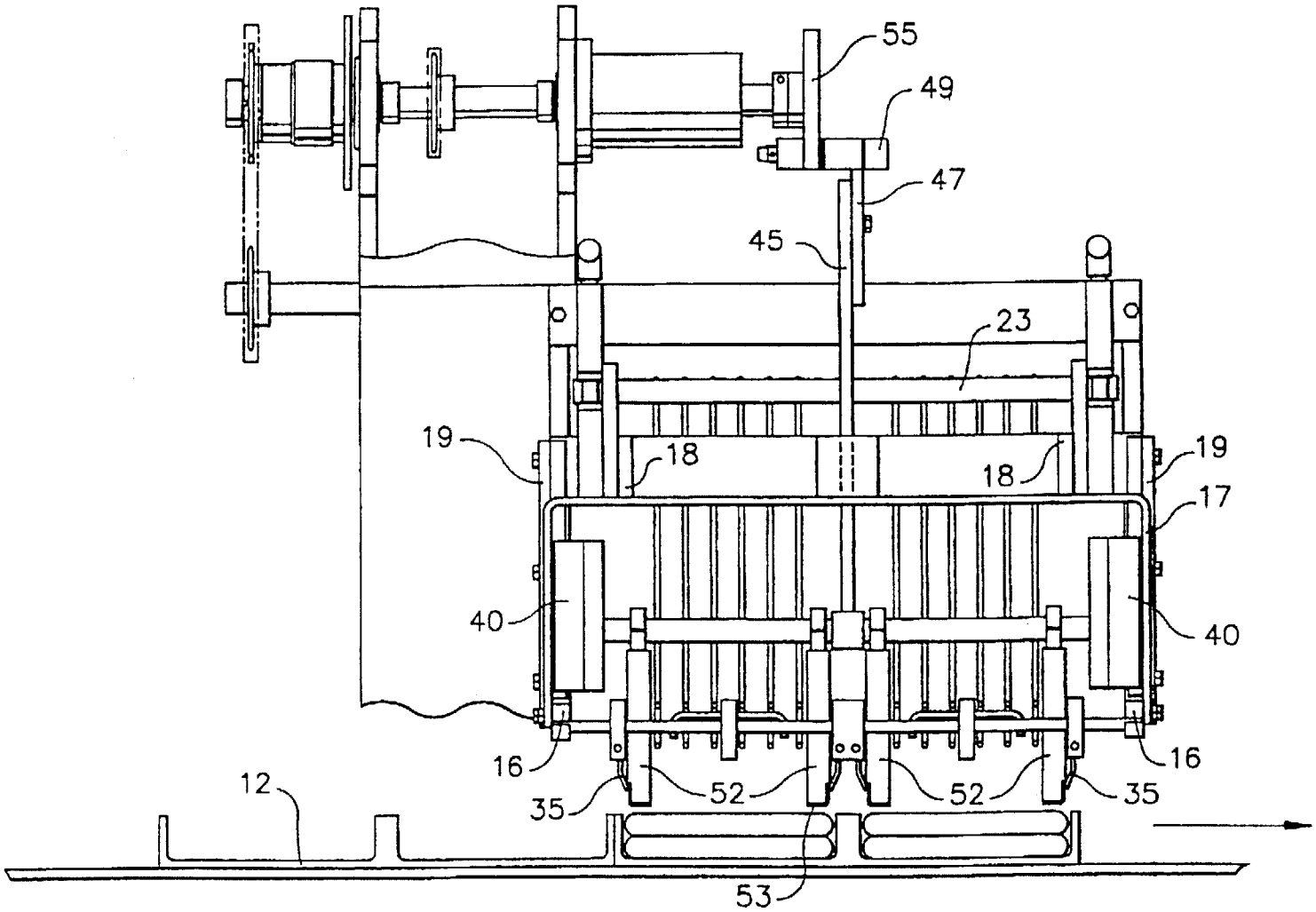
FIG. 5 is a front view of the food article filling head of FIG. 1 showing the food articles immediately after discharge from the filling head into packaging trays.

The balance of the pusher bar unloading system comprises vertical pusher bars 52 mounted on the horizontal shaft 44 and elongated stainless steel pusher members 53 on the ends of the pusher bars. Four pusher bars are positioned on the horizontal shaft such that each pusher bar is directly over a flapper door as best seen in FIG. 5. Each of the pusher bars 52 has a split collar 54 at one end and is fixedly secured to the shaft 44 by tightening of a screw in the collar. The pusher members 53 fixedly secured at the free end of the pusher bars are elongated members which are horizontally disposed and extend substantially the length of the flapper doors.

A rigid guide member 56 is secured to the cross-member brace 17 of the frame 15 at an approximate mid-point between the upper support members 18 to contain the drive rod of the pusher bar unloading system. The guide member 56 has a slot 57 through which the drive rod 45 passes. The slot has a length which permits the drive rod to move in response to the revolving crank arm while it has a width which restricts any lateral movement of the drive rod. Movement of the drive rod up and down causes a consequent movement of the elongated pusher members in concert. Thus, a downward stroke of the drive rod forces the horizontal shaft to move down. It is kept horizontal by its rigid attachment to the slide blocks and their movement along the vertical rails. In turn the pusher bars and the pusher members are forced down in unison to contact the franks and indirectly force open the flapper doors simultaneously. Movement of the drive rod upwardly reverses the movement of the shaft, pusher bars and pusher members. It is the smooth operation of the pusher bar unloading system which is responsible for the enhanced speed and efficiency of the feeding head of the invention. Rotary motion is effectively transferred through the system with a minimum of inertia and friction.

The franks to be loaded into the packaging trays travel along an endless input conveyor 60 of the loader parent machine 11. As shown, the franks are directed into two rows as they approach the filling head 10. The input conveyor 60 has a plurality of spaced receptacles 61 arranged in parallel rows such that each frank travels down the conveyor in an aligned fashion. The receptacles 61 are disposed and supported by a sprocket chain assembly driven by a sprocket wheel 62 mounted on a shaft 63. Each receptacle 61 is a L-shaped support with a ridge 64 positioned mid-way in a base leg to minimize contact of the frank with the leg. A protrusion 65 at the end of the base leg helps to retain the frank in the receptacle.

The franks are transferred from the input conveyor 60 to the filling head 10 with the aid of a single piece filling head cage 66. The cage 66 is a set of S-shaped guide-wires positioned at the end of the input conveyor 60 and adjacent the receiving end of the filling head 10. The guide wires are disposed in a spaced generally vertical relation to one another to collectively retain and guide the franks around the sprocket wheel 62 and drop them into an accumulating area. A sweep finger 67 mounted on a shaft 68 continuously rotates and engages the franks to create groupings of franks in a predetermined number. Pusher pins on a conveyor belt (not shown) push each grouping of franks from the accumulating area into the filling head. The whole system is synchronized such that when the filling head is unloaded and the pusher members moved upwardly to allow the flapper doors to close, the frank groupings are conveyed into the loading area of the filling head until it is fully loaded. The end stops on the frame limit their forward travel.

The sprocket wheel 62 of the input conveyor 60, the flywheel 55 used to transfer power to the drive rod, and the sweep finger 67 are mounted on shafts which are run by the same power source and are synchronized so that the proper number of franks are delivered to the filling head at the proper time. With reference to FIG. 1, the main power source delivers power to the shaft 70 and its associated sprocket wheel 71. Power is delivered to the reversing sprocket wheel 72 which in turn is delivered to the sweep finger 67. The sprocket wheel 72 also delivers power to the interchangeable sprocket wheel 73 mounted on a shaft 74. A proximity sensor 75 is operably associated with the shaft 68 and is used to sense revolutions of the shaft Its reading is transmitted to a computer 76. In effect, the number of frank groupings put into the filling head by operation of the sweep finger 67 is transmitted to the computer through operation of the proximity sensor 75. When the predetermined number of franks are loaded into the filling head, the computer energizes a single cycle clutch 77 (as best seen in FIG. 4) to cause a shaft 78 to revolve one full turn. This power is transferred through its associated sprocket wheel 79 to cause one revolution of the shaft 80 and its associated flywheel 55 and an unloading the franks into the trays. A set of sprocket chains (shown in schematic hidden lines in the figures) transfers power from the power source and to the various sprocket wheels and their shafts. The various gearings and idler wheels used in the power transfers are conventional.

The single power source powers the filling head and the loader parent machine. The loading of the filling head is synchronized with the delivery of franks from the input conveyor of the loader parent machine and the intermittent discharge of the filling head. The versatility of the filling head is enhanced by the fact the interchangeable sprocket wheel 73 can be changed to change cycle speed with a consequent different frank grouping size loaded into the filling head.

As illustrated, two packaging trays 12 are being loaded simultaneously by the filling head 10. The packaging trays travel along a conveyor (not shown) transverse to the food article filling head. The positioning of the packaging trays and their travel is done in a conventional manner.

In operation, a filling head of the invention with the requisite food article size and configuration for a desired packaging arrangement is positioned near the loader parent machine. The mounting guide pins and the horizontal mounting bar are matched with the mount holes and receiving brackets, respectively of the parent machine. The bar is shoved fully into the receiving grooves and the drop pins properly positioned. Next, the crank arm at the end of the drive rod is aligned with the flywheel, the quick connect pin inserted fully and the cotter pin added to connect the filling head to the power system of the parent machine. The input conveyor of the parent machine and the drive rod movement are synchronized such that food articles traveling down the input conveyor of the parent machine are loaded into the filling head when the drive rod is in the upward position. Upon being fully loaded, the drive rod on a downward swing forces the elongated pusher members to push directly and evenly down on the food articles with sufficient force to cause the flapper doors to swing open and the food articles to drop directly down in a planar relationship to the awaiting packaging trays. As the drive rod begins its upwardly movement, the elongated pusher members pull back up to allow the flapper doors to close. A new batch of food articles are then loaded into the filling head. The loading process is completed prior to the drive rod moving back down.

While the invention has been described in detail, it should be understood various changes can be made. All such modifications of an obvious nature and all uses of the food article filling head to load food articles of all natures and in all packaging arrangements are considered within the scope of the appended claims.

What is claimed is:

1. A food article filling head for connection to a loader parent machine to intermittently receive a preset number of food articles and discharge said food articles into individual packaging trays, said filling head comprising:

(a) an open frame having quick connect means for ready attachment to the loader parent machine to receive food articles moving in alignment along an input conveyor of the parent machine;

(b) at least two flapper doors hingeably attached to the open frame in a side by side arrangement to collectively form a substantially flat receiving surface to hold the food articles as they are loaded into the filling head from the input conveyor; and (c) a pusher bar unloading system capable of being operably connected to a power system of the loader parent machine to intermittently discharge the food articles in the filling head to the individual packaging trays positioned below the flapper doors, said unloading system having (i) a set of vertical slide blocks slideably mounted on rails of the open frame, (ii) a horizontal shaft rigidly attached at each of its ends to the slide blocks, (iii) a drive rod pivotally attached at one end to the horizontal shaft for rotatably attaching to a flywheel of the power system to run in a smooth continuous fashion to deliver a generally up and down motion to the horizontal shaft, (iv) a set of vertical pusher bars rigidly attached to the horizontal shaft, and (v) a horizontal elongated pusher member rigidly attached to each of the pusher bars, each said pusher member extending substantially the length of the flapper doors so as to be in an engaging position with the food articles when said drive rod is in a lowermost position to force the food articles downwardly with sufficient force to substantially fully extend the flapper doors to an open position to cause said food articles to drop into the packaging trays and to move to a disengaging position when said drive rod is in an uppermost position.

2. The food article filling head of claim 1 wherein each slide block is an assembly comprising a plastic slide block which slides along the rail and a metal bearing block rigidly holding an end of the horizontal shaft, said slide block and said bearing block being fixedly secured together.

3. The food article filling head of claim 1 wherein the open frame comprises two horizontal lower support members, a cross-member brace rigidly attached to the lower support members, and a vertical rail support member extending from each lower support member wherein the rails for the slide blocks extend substantially along the length of each vertical rail support member.

4. The food article filling head of claim 3 further comprising end stops on the open frame positioned to prevent the forward movement of the food articles as they are loaded into the filling head.

5. The food article filling head of claim 4 wherein the open frame further has a rigid guide member secured to the cross-member brace, said guide member having a slot through which the drive rod passes.

6. The food article filling head of claim 5 wherein a door rod extends along each of the horizontal lower support members and is secured thereto and the flapper doors are hingeably attached on the door rods.

7. The food article filling head of claim 6 further wherein at least two torsional springs are mounted on each door rod to hold the flapper doors in a substantially horizontal closed position during rest.

8. The food article filling head of claim 7 wherein the open frame is configured to have two sets of the spring loaded flapper doors to receive two aligned rows of the food articles.

9. The food article filling head of claim 7 wherein each flapper door has a width adequate to provide ends of the food articles with sufficient support to maintain said food articles in a planar disposition.

10. The food article filling head of claim 9 wherein each flapper door has a width of from about one inch to about three inches.

11. The food article filling head of claim 1 wherein the quick connect means to the loader parent machine comprises a transverse horizontal mounting bar extending across the horizontal upper support members of the frame and positioned to be received in grooves of mounting blocks which are permanently attached to the loader parent machine and is capable of being locked into said groove by drop pins.

12. The food article filling head of claim 11 wherein the drive rod of the pusher bar unloading system is rigidly attached to a crank arm and further wherein said crank arm has a quick connect pin for attachment to the flywheel of the loader parent machine power system.

13. A food article loader machine having a filling head and a loader parent machine operably connected and powered by a common power system to intermittently discharge a present number of food articles into individual packaging trays, wherein the improvement comprises a filling head characterized in having:

(a) an open frame with quick connect means attached to the loader parent machine to receive food articles moving in alignment along an input conveyor of the parent machine;

(b) at least two flapper doors hingeably attached to the open frame in a side by side arrangement to collectively form a substantially flat receiving surface to hold the food articles as they are loaded into the filling head from the input conveyor; and (c) a pusher bar unloading system operably connected to the power system of the loader parent machine to intermittently discharge the food articles in the filling head to the individual packaging trays positioned below the flapper doors, said unloading system having (i) a set of vertical slide blocks slideably mounted on rails of the open frame, (ii) a horizontal shaft rigidly attached at each of its ends to the slide blocks, (iii) a drive rod pivotally attached at one end to the horizontal shaft and rotatably attached to a flywheel of the power system to run in a smooth continuous fashion to deliver a generally up and down motion to the horizontal shaft, (iv) a set of vertical pusher bars rigidly attached to the horizontal shaft, and (v) a horizontal elongated pusher member rigidly attached to each of the pusher bars, each said pusher member extending substantially the length of the flapper doors so as to be in an engaging position with the food articles when said drive rod is in a lowermost position to force the food articles downwardly with sufficient force to substantially fully extend the flapper doors to an open position to cause said food articles to drop into the packaging trays and to move to a disengaging position when said drive rod is in an uppermost position.

14. The food article loader machine of claim 13 wherein the input conveyor of the loader parent machine and the flywheel used to run the drive rod of the filling head are driven by the same power source at a synchronized speed.

15. The food article loader machine of claim 14 wherein a single cycle clutch is operably connected to the power system to intermittently deliver power to the flywheel.

16. The food article loader machine of claim 15 wherein the power system includes an interchangeable sprocket wheel operably connected to the single cycle clutch to deliver a selected number of the food article groupings to the filling head.

*17. A food article filling head for connection to a loader parent machine to intermittently receive a preset number of food articles and discharge said food articles into individual packaging trays, said filling head comprising:*

*(a) an open frame having a quick connect for ready attachment to the loader parent machine to receive food articles moving in alignment along an input conveyor of the parent machine;*

*(b) at least two flapper doors pivotally attached to the open frame in a side by side arrangement to collectively form a substantially flat receiving surface to hold the food articles as they are loaded into the filling head from the input conveyor; and*

*(c) a pusher bar unloading system capable of being operably connected to a power system of the loader parent machine to intermittently discharge the food articles in the filling head to the individual packaging trays positioned below the flapper doors.*

*18. The food article filling head of claim 17 wherein the pusher bar unloading system includes (i) a set of vertical slide blocks slideably mounted on rails of the open frame, (ii) a horizontal shaft rigidly attached at each of its ends to the slide blocks, (iii) a drive rod pivotally attached at one end to the horizontal shaft for rotatably attaching to a flywheel of the power system to run in a smooth continuous fashion to deliver a generally up and down motion to the horizontal shaft, (iv) a set of vertical pusher bars rigidly attached to the horizontal shaft, and (v) a horizontal elongated pusher member rigidly attached to each of the pusher bars, each said pusher member extending substantially the length of the flapper doors so as to be in an engaging position with the food articles when said drive rod is in a lowermost position to force the food articles downwardly with sufficient force to substantially fully extend the flapper doors to an open position to cause said food articles to drop into the packaging trays and to move to a disengaging position when said drive rod is in an uppermost position.*

*19. The food article filling head of claim 18 wherein the power system of the loader parent machine includes a flywheel to which the drive rod is rotatably attached.*

*20. The food article filling head of claim 18 wherein each slide block is an assembly comprising a plastic slide block which slides along the rail and a metal bearing block rigidly holding an end of the horizontal shaft, said slide block and said bearing block being fixedly secured together.*

*21. The food article filling head of claim 17 wherein the open frame comprises two horizontal lower support members, a cross-member brace rigidly attached to the lower support members, and a vertical rail support member extending from each lower support member wherein the rails for the slide blocks extend substantially along the length of each vertical rail support member.*

*22. The food article filling head of claim 21 further comprising end stops on the open frame positioned to prevent the forward movement of the food articles as they are loaded into the filling head.*

*23. The food article filling head of claim 22 wherein the open frame further has a rigid guide member secured to the cross-member brace, said guide member having a slot through which the drive rod passes.*

*24. The food article filling head of claim 23 wherein a door rod extends along each of the horizontal lower support members and is secured thereto and the flapper doors are pivotally attached on the door rods.*

*25. The food article filling head of claim 24 further wherein at least two torsional springs are mounted on each door rod to hold the flapper doors in a substantially horizontal closed position during rest.*

*26. The food article filling head of claim 25 wherein the open frame is configured to have two sets of the spring loaded flapper doors to receive two aligned rows of the food articles.*

*27. The food article filling head of claim 25 wherein each flapper door has a width adequate to provide ends of the food articles with sufficient support to maintain said food articles in a planar disposition.*

*28. The food article filling head of claim 27 wherein each flapper door has a width of from about one inch to about three inches.*

*29. The food article filling head of claim 17 wherein the quick connect to the loader parent machine comprises a transverse horizontal mounting bar extending across the horizontal upper support members of the frame and positioned to be received in grooves of mounting blocks which are permanently attached to the loader parent machine and is capable of being locked into said groove by drop pins.*

*30. The food article filling head of claim 29 wherein the drive rod of the pusher bar unloading system is rigidly attached to a crank arm and further wherein said crank arm has a quick connect pin for attachment to the flywheel of the loader parent machine power system.*

*31. A food article filling head of a food article loading system including a loader parent machine with a power system to intermittently receive a preset number of food articles and discharge said food articles into individual packaging trays, said filling head comprising:*

*(a) an open frame for receiving food articles moving in alignment along an input conveyor of the parent machine;*

*(b) at least two flapper doors pivotally attached to the open frame in a side by side arrangement to collectively form a substantially flat receiving surface to hold the food articles as they are loaded into the filling head from the input conveyor;*

*(c) a flywheel operably connected to the power system of the loader parent machine; and*

*(d) a pusher bar unloading system capable of being operably connected to the flywheel to intermittently*

*discharge the food articles in the filling head to the individual packaging trays positioned below the flapper doors.*

*32. The food article filling head of claim 31 wherein the pusher bar unloading system includes (i) a set of vertical slide blocks slideably mounted on rails of the open frame, (ii) a horizontal shaft rigidly attached at each of its ends to the slide blocks, (iii) a drive rod pivotally attached at one end to the horizontal shaft and pivotally attached at the other end to the flywheel to run in a smooth continuous fashion to deliver a generally up and down motion to the horizontal shaft, (iv) a set of vertical pusher bars rigidly attached to the horizontal shaft, and (v) a horizontal elongated pusher member rigidly attached to each of the pusher bars, each said pusher member extending substantially the length of the flapper doors so as to be in an engaging position with the food articles when said drive rod is in a lowermost position to force the food articles downwardly with sufficient force to substantially fully extend the flapper doors to an open position to cause said food articles to drop into the packaging trays and to move to a disengaging position when said drive rod is in an uppermost position.*

*33. The food article filling head of claim 32 wherein each slide block is an assembly comprising a plastic slide block which slides along the rail and a metal bearing block rigidly holding an end of the horizontal shaft, said slide block and said bearing block being fixedly secured together.*

*34. The food article filling head of claim 32 wherein the open frame comprises two horizontal lower support members, a cross-member brace rigidly attached to the lower support members, and a vertical rail support member extending from each lower support member wherein the rails for the slide blocks extend substantially along the length of each vertical rail support member.*

*35. The food article filling head of claim 34 further comprising end stops on the open frame positioned to prevent the forward movement of the food articles as they are loaded into the filling head.*

*36. The food article filling head of claim 35 wherein the open frame further has a rigid guide member secured to the cross-member brace, said guide member having a slot through which the drive rod passes.*

*37. The food article filling head of claim 36 wherein a door rod extends along each of the horizontal lower support members and is secured thereto and the flapper doors are pivotally attached on the door rods.*

*38. The food article filling head of claim 37 further wherein at least two torsional springs are mounted on each door rod to hold the flapper doors in a substantially horizontal closed position during rest.*

*39. The food article filling head of claim 38 wherein the open frame is configured to have two sets of the spring loaded flapper doors to receive two aligned rows of the food articles.*

*40. The food article filling head of claim 38 wherein each flapper door has a width adequate to provide ends of the food articles with sufficient support to maintain said food articles in a planar disposition.*

*41. The food article filling head of claim 40 wherein each flapper door has a width of from about one inch to about three inches.*

*42. The food article filling head of claim 32 wherein the open frame includes a quick connect for ready attachment to the loader parent machine.*

*43. The food article filling head of claim 42 wherein the quick connect to the loader parent machine comprises a transverse horizontal mounting bar extending across the horizontal upper support members of the frame and positioned to be received in grooves of mounting blocks which are permanently attached to the loader parent machine and is capable of being locked into said groove by drop pins.*

*44. The food article filling head of claim 43 wherein the drive rod of the pusher bar unloading system is rigidly attached to a crank arm and further wherein said crank arm has a quick connect pin for attachment to the flywheel of the loader parent machine power system.*

* * * * *